United States Patent
Lindsay (10) Patent No.: US 7,502,318 B2
(45) Date of Patent: *Mar. 10, 2009

(54) NETWORK ADAPTER WITH TCP WINDOWING SUPPORT

(75) Inventor: Steven B. Lindsay, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 927 days.

This patent is subject to a terminal disclaimer.

(21) Appl. No.: 10/916,727

(22) Filed: Aug. 11, 2004

(65) Prior Publication Data

US 2006/0034176 A1 Feb. 16, 2006

Related U.S. Application Data

(63) Continuation of application No. 09/369,500, filed on Aug. 5, 1999, now Pat. No. 6,788,704.

(51) Int. Cl.
*G06F 3/00* (2006.01)
(52) U.S. Cl. ............... 370/230; 370/235; 370/395.4; 370/400; 710/33
(58) Field of Classification Search ............... 714/749
See application file for complete search history.

(56) References Cited

U.S. PATENT DOCUMENTS

| 5,761,427 | A | | 6/1998 | Shah .................. 395/200.53 |
| 5,937,169 | A | * | 8/1999 | Connery et al. ............ 709/250 |
| 6,189,065 | B1 | | 2/2001 | Arndt et al. .................. 710/260 |
| 6,301,249 | B1 | | 10/2001 | Mansfield et al. ........... 370/394 |
| 6,487,689 | B1 | | 11/2002 | Chuah ...................... 714/748 |
| 6,564,267 | B1 | * | 5/2003 | Lindsay ..................... 709/250 |
| 6,788,704 | B1 | * | 9/2004 | Lindsay ..................... 370/465 |
| 2004/0042464 | A1 | * | 3/2004 | Elzur et al. ............ 370/395.52 |

OTHER PUBLICATIONS

Microsoft, "Windows 2000 DDK Task Offload", (Oct. 22, 1999), 19 pages.

* cited by examiner

*Primary Examiner*—Chi H. Pham
*Assistant Examiner*—Shick Hom
(74) *Attorney, Agent, or Firm*—Blakely, Sokoloff, Taylor & Zafman LLP (57) ABSTRACT

A network adapter and corresponding method for its use are disclosed. The network adapter has an operational mode that allows a host CPU to offload transmission of a block of data to the adapter. The adapter segments the block into fragments, and builds a data packet for each fragment. The adapter transmits these packets with an adapter-implemented flow control. This flow control uses: a context engine that tracks flow control variables for a "context" established for the block; a context memory for storing the variables; and a receive filter that updates flow control information for the block based on ACK packets received from the remote endpoint receiving the data packets. Because the network adapter implements flow control for data blocks that the network adapter segments, intermediate ACK packets corresponding to that block can be intercepted by the adapter, before they pass to the host, conserving host resources. An added advantage is that the host CPU can offload data blocks larger than the remote endpoint's receive window size, since the adapter can follow the transmit window and transmit packets at appropriate intervals. This further decreases load on the host CPU, decreases latency, and improves bandwidth utilization.

26 Claims, 7 Drawing Sheets

NETWORK ADAPTER WITH TCP WINDOWING SUPPORT

This U.S. patent application is a continuation of and claims priority to U.S. patent application Ser. No. 09/369,500 filed Aug. 5, 1999, now issued as U.S. Pat. No. 6,788,704.

FIELD OF THE INVENTION

This present invention relates to computer networking, and more particularly to a method and apparatus for sharing transport protocol tasks between a host and an attached network adapter.

BACKGROUND OF THE INVENTION

The rapid growth in computer networking has spurred the development of ever-faster network media rates. For instance, over the last ten years, Ethernet-format maximum media rates have gone from 10 megabits-per-second (Mbps), to 100 Mbps (fast Ethernet), and now to 1000 Mbps (gigabit Ethernet). Future increases are planned to allow even faster network communications.

Traditionally, networked host computers have handled communication tasks at the network and transport layers (and some tasks at the link layer) using host software, while leaving the remaining link and physical layer communication tasks to an attached network adapter (which also may be partially implemented in host-resident driver software). Thus for virtually every packet transmitted or received by the network adapter, the host processor must expend resources in handling packetization, header manipulation, data acknowledgment, and error control. At gigabit Ethernet speeds, even sophisticated server systems will often have a maximum network transmission rate limited by the ability of the host processor to handle its network and transport layer tasks, rather than by the speed of the physical connection. Consequently, host-implemented networking tasks can reduce bandwidth utilization and occupy processor throughput that could otherwise be devoted to running applications.

Some network adapter vendors have attempted to increase network performance by offloading the entire transport and lower-layer protocol stack to the network adapter. This approach greatly eases the burden on the host processor, but increases the complexity and expense of the adapter. It also limits flexibility, limits upgradability, and makes platform-specific tailoring difficult. Such an adapter may also require that the entire network stack be rewritten to allow the hardware solution to integrate with the operating system.

Several less-severe modifications to the traditional division of labor between a host processor and a network adapter have also been proposed. One of the more appealing of these proposals is a feature known as "TCP segmentation offload" (See the Microsoft Windows 2000 Device Driver Development Kit for detailed information. Transmission Control Protocol/Internet Protocol (TCP/IP) is perhaps the most popular transport/network layer protocol suite in use today. See Network Working Group, RFC 791, *Internet Protocol* (1981); Network Working Group, RFC 793, *Transmission Control Protocol* (1981)). With TCP segmentation offload, the host processor can indicate to the network adapter that a large block of data is ready for TCP transmission, rather than passing numerous smaller TCP packets (each containing part of the large block of data) to the network adapter. With offloading, the network adapter segments the block of data into the smaller packets, builds the TCP, IP, and link-layer headers for each packet, and transmits the packets.

TCP segmentation offload benefits overall system performance due to several factors. First, sending a large block of data requires fewer calls down through the software protocol stack than does sending multiple small blocks, thus reducing CPU utilization for a given workload. Second, when the headers are built in the network adapter hardware, header-building host overhead is avoided, and header information must only be transferred across the host bus once per block rather than once per packet, reducing latency and lowering bus utilization. And third, the network adapter hardware can reduce the number of host interrupts that it generates in order to indicate data transmission, in some instances down to one per block.

I have now recognized that, despite its benefits, TCP segmentation offload has several rather large limitations. First, the size of the block offloaded cannot be larger than the receiving endpoint's TCP window size (typically equal to somewhere between two and ten maximum-sized Ethernet packets). And second, the host processor must still process roughly the same number of acknowledgment packets (ACKs) from the receiving endpoint—roughly one-half to one ACK per data packet sent—despite the segmentation offloading.

SUMMARY OF THE INVENTION

In accordance with one aspect of the present invention, a method for operating a network adapter is disclosed. This method comprises the steps of accepting a request from a host-based transmission protocol layer to transmit a block of data to a remote endpoint, segmenting the block of data into multiple data packets, and transmitting the packets to the remote endpoint. During the execution of these steps, the network adapter (either in hardware or in its software driver) interprets acknowledgment data sent by the remote endpoint to the host-based transmission protocol layer, as it passes through the adapter. Preferably, the network adapter also controls transmission of the multiple data packets based on the remote endpoint's receive window size and other interpreted acknowledgment data. In a particularly preferred embodiment, the adapter traps acknowledgment data bound for the host-based transmission protocol layer, when the acknowledgment data pertains only to the data packets created by the adapter's segmentation.

In another aspect of the invention, a network adapter is disclosed. The adapter comprises a network interface and a packet buffer memory that buffers packets for transmission over this interface. The adapter also has a context engine that establishes and services connection contexts corresponding to requests for transmission of large data blocks that must be segmented. A packet engine segments such large data blocks into multiple data packets and places these packets in the packet buffer memory. As acknowledgment packets corresponding to the data packets are received via the network interface, a receive filter associates these with the context. The context engine uses flow control (e.g., window size) information taken from the acknowledgment packets to control when the packet engine places data packets in the packet buffer. Preferably, the receive filter selectively intercepts acknowledgment packets associated with the connection context. Also preferably, the adapter includes a context memory that allows it to simultaneously serve multiple connection contexts submitted by the host.

In a further aspect of the invention, a computer system is disclosed. The system has a host processor and a network adapter, both in communication with a system bus. The host processor is software-configured to run a network transport protocol. But the host processor configuration allows the host processor to temporarily relinquish outgoing flow control for a given transport connection to the network adapter, in conjunction with a request to the network adapter to transmit a block of data. The network adapter has an operational mode that allows it to accept a block of data, segment it into smaller blocks for transmission, and provide flow control for those blocks.

An article of manufacture comprising a computer-readable medium containing a program for operating a network transport protocol is also disclosed. When executed, the program configures a processor to run a packet flow controller. It also runs a packet segmentation offloader that can offload packetization of data blocks to a network interface card. The offloader has the capability to instruct the network interface card to temporarily handle flow control for a data block that it is tasked with segmenting. The program also runs a flow control selector that selects, for a given data block, whether to handle packet flow control using the packet flow controller, or to instruct the network interface card to handle packet flow control for the block.

Finally, an article of manufacture comprising a computer-readable medium containing a driver program for a network adapter is disclosed. When executed, the driver program configures a processor to run a packet segmentation offload scheduler that accepts requests from a higher-level protocol (e.g., TCP) to segment a data block and temporarily handle flow control for that block. The scheduler accepts these requests and schedules them onto a network adapter controlled by the driver program. Preferably, the scheduler can track the number of contexts being handled by the hardware, and either queue requested contexts or reject requested contexts when the context hardware is already saturated. The driver also runs a packet segmentation offload status reporter for communicating the status of accepted requests to the higher-level protocol.

BRIEF DESCRIPTION OF THE DRAWING

The invention may be best understood by reading the disclosure with reference to the drawing, wherein.

DETAILED DESCRIPTION OF THE PREFERRED EMBODIMENTS

The preferred embodiments disclosed below were selected by way of illustration and not by way of limitation. The terms network adapter and network interface card (NIC) are used somewhat interchangeably herein, with the realization that a network adapter need not be implemented on a "card", but may, e.g., be implemented directly on a motherboard or in an embedded network appliance. Also, a network adapter typically comprises both a hardware component and a software driver running on the host system.

As used herein, a "context" or "connection context" refers to the group of variables (addresses, data pointers, etc.) used to describe a job offloaded to the network adapter according to an embodiment of the invention. Although a context for each of several TCP/IP connections may be open simultaneously, normally only one context for any one connection will be active at any given time.

Briefly and by way of introduction, overcoming the two identified limitations of TCP segmentation offload—offload block size limitations and no decrease in acknowledgment processing requirements—has motivated the development of the disclosed embodiments. The disclosed embodiments can overcome both of these limitations without destroying the benefits of TCP segmentation offload, and thus offer the potential for substantial additional performance enhancements. In general, these embodiments overcome these limitations by having the host temporarily relinquish, to the network adapter, outgoing flow control for a given connection whenever the host requests transmission of a large block of data over that connection (the flow control referred to herein is transport layer, rather than link layer, e.g., IEEE 802.3x, flow control). Because the network adapter is allowed to handle flow control for the block, the block can be larger than the receiving endpoint's window—the adapter moderates the outgoing packet data flow rate to accommodate the receiving endpoint. Likewise, the network adapter can trap ACKs sent back to the host from the receiving endpoint during the time that the adapter handles flow control, relieving the host of the burden of processing these. But the host preferably otherwise controls the connection, making the resulting multi-packet transaction appear to be essentially a single large TCP/IP transaction to the host.

An additional advantage of some embodiments is the ability to achieve a substantial host CPU performance gain over TCP segmentation offload in large data block situations, with only an incremental increase in network adapter complexity. This allows the network adapter hardware to be significantly simpler than if it were, for example, to attempt to handle a wide variety of TCP/IP communications for the host. At the same time, those TCP/IP communications tasks that are relatively complex but consume little host resources are left in host software, allowing maximum flexibility for modifications, upgrades, configuration, and vendor-specific networking features.

Figure 1:
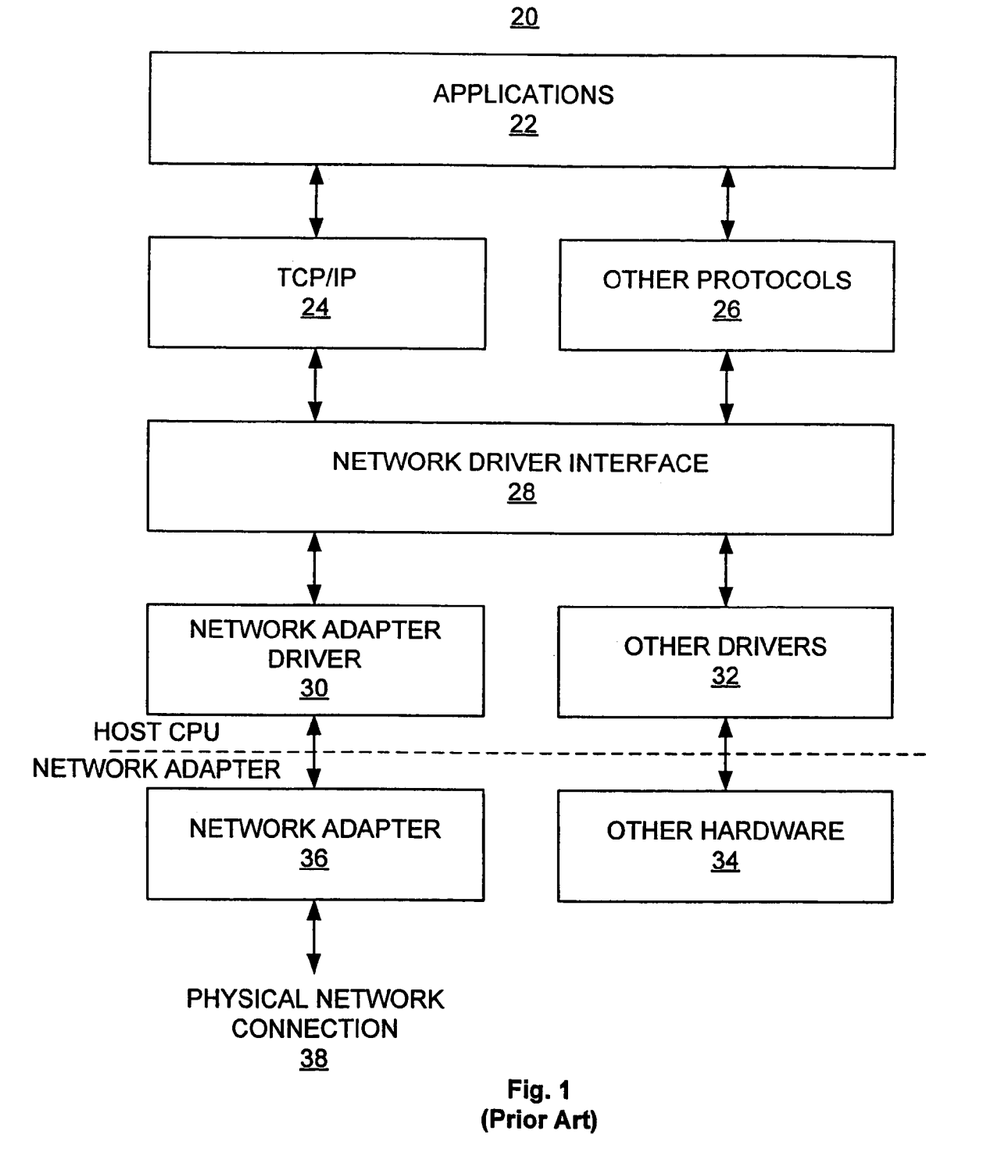
FIG. 1 illustrates a protocol stack, showing the division of labor between a host CPU and a network adapter.

Turning now to the details of the embodiments, FIG. 1 illustrates a typical network communications stack for a network adapter-equipped computer. Those task performed in software on the host CPU are shown above the dashed line. At the highest level, applications 22 such as FTP, ping, etc., communicate with TCP/IP 24 and/or other protocols 26. TCP/IP 24 communicates with network driver interface 28, which allows multiple transport/network protocols of different types to bind to a single network interface card driver, and also allows a single protocol to bind to multiple network interface card drivers.

Each network adapter typically comprises a software driver 30 that runs on the host CPU, and network adapter hardware 36. Driver 30 and adapter 36 communicate across a bus accessible by both the CPU and adapter 36, such as a PCI (Peripheral Component Interconnect) local bus. Adapter 36 connects to a physical network connection 38, such as an electrical or optical gigabit Ethernet link.

Figure 2:
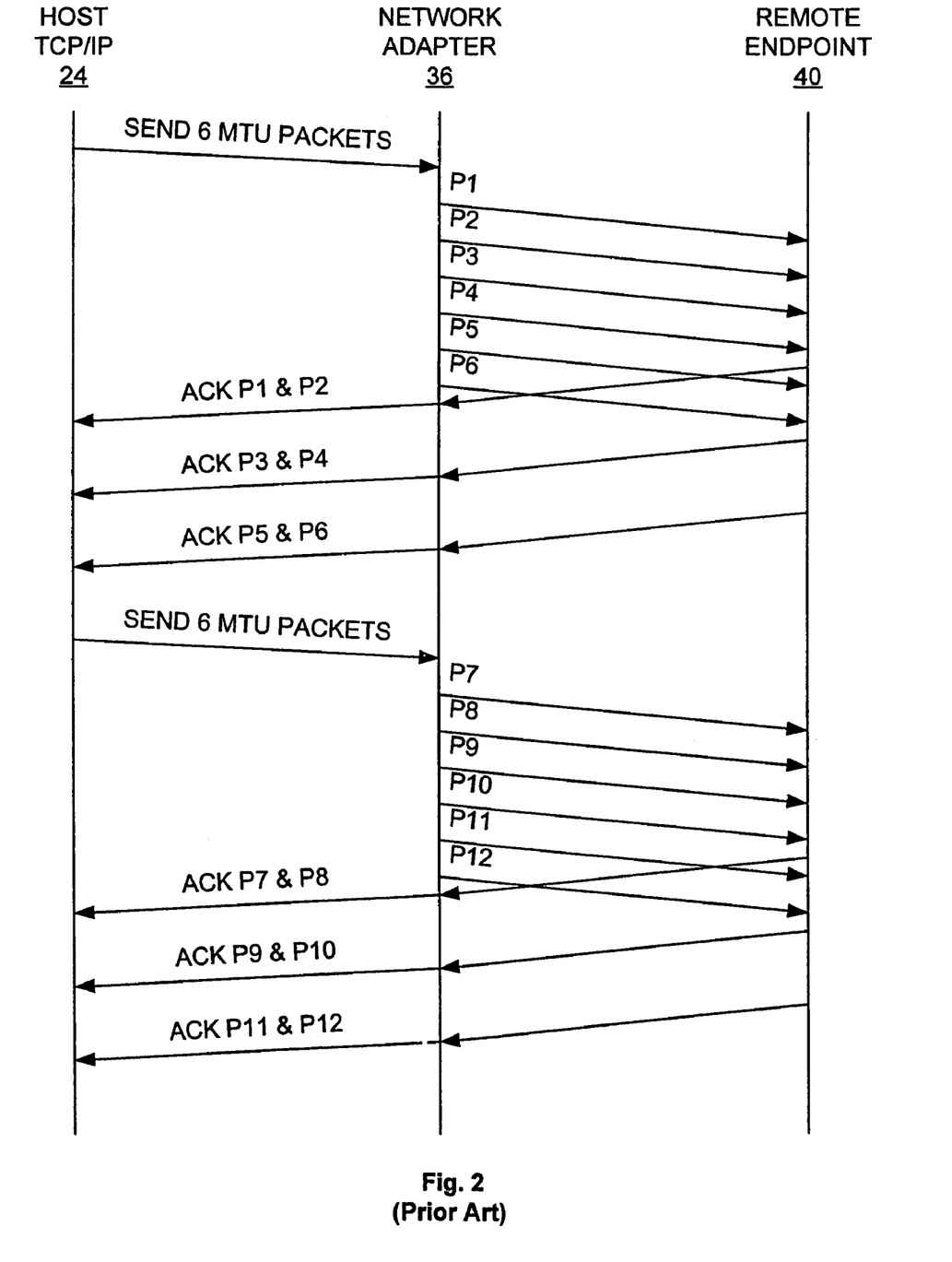
FIG. 2 shows a message sequence for data transmission using prior art TCP offloading.

FIG. 2 illustrates signaling for a prior art TCP/IP transaction using TCP segmentation offload. An application has tasked host TCP/IP 24 with transmitting a data block to remote endpoint 40, the data block being twelve MTU (an Ethernet Maximum Transfer Unit is 1514 octets, or 1460 octets of TCP payload after allowance for TCP, IP, and Ethernet headers) blocks in length. For this example, the remote endpoint has reported a receive window size of six MTU blocks.

Host TCP/IP 24 knows that it can use TCP segmentation offload to request that network adapter 36 build and transmit multiple packets to remote endpoint 40. But it cannot use TCP segmentation offload to send a data block that exceeds the remote endpoint's window size, since the segmentation offload is essentially an uncontrolled transfer, once initiated. Therefore, host TCP/IP 24 issues a request to network adapter driver 30 to send as much as is allowed (six MTU packets, corresponding to the receive window size) of the twelve MTU data block that it desires to send.

Network adapter 36 gathers header and data information for six packets P1-P6 from memory and assembles the packets. Note that the request issued by host TCP/IP 24 preferably indicates the locations in memory for the data and header information, and adapter 36 performs DMA operations (e.g., accesses the PCI local bus as bus master) to main memory to obtain the data independent of the host CPU. The network adapter's tasks include segmenting the data block into six 1460 octet payloads, appending a 20 octet TCP, a 20 octet IP, and a 14 octet Ethernet header to each payload, and computing and inserting checksum information into the headers to form packets P1-P6. Packets P1-P6 are then transmitted sequentially to remote endpoint 40. Network adapter 36 also interrupts (not shown in FIG. 2) the host to report packet transmission. This interrupt sequence may happen once per packet, once after all packets are transmitted, or at several intermediate steps.

Remote endpoint 40 sends TCP ACK packets back to host TCP/IP 24 to acknowledge safe receipt of packets P1-P6. Typically, the endpoint will send an ACK packet for every two packets it receives. Endpoint 40 will (after a delay for passing each received data packet up its stack and passing the acknowledgment back down) transmit a first ACK for packets P1 and P2, a second ACK for packets P3 and P4, and a third ACK for packets P5 and P6. Each ACK packet has the 32-bit acknowledgment number field of its TCP header set to the next sequence number that the endpoint expects to receive, indicating successful receipt of all data with smaller sequence numbers. Thus the ACK packet returned by remote endpoint 40 after receipt of P1 and P2 will have an acknowledgment number corresponding to the first octet of P3.

In addition to the acknowledgment field, several other TCP fields in the ACK packet are significant. The ACK control bit is set to indicate that the acknowledgment field is valid. And the window field indicates the number of data octets, beginning with the one indicated in the acknowledgment field, that the sender of the ACK packet is willing to accept.

When network adapter 36 receives each ACK packet, it DMAs the packet into main memory and normally generates an interrupt to the host CPU. Sometime later, the network adapter driver rung on the host will process the interrupt and indicate the ACK packet up the software stack. The packet will pass through one or more software layers, where it may be copied. Eventually, TCP will process the ACK and update the transmit window size.

Once TCP has processed the ACK that corresponds to packets P5 and P6, it knows that the TCP segmentation offload operation has completed successfully. The transmit window size should also have grown back to six MTUs in length. Thus TCP can now issue another TCP segmentation offload request to network adapter 36 for the other six MTUs of the original request. Assuming that the request proceeds normally as did the first, transmission of the entire twelve MTU data block will complete after TCP processes the ACK of packets P11 and P12.

It can be appreciated from FIG. 2 that the host CPU benefits from having the network adapter 36 assemble packets. The host avoids computing checksums and building individual packet headers. Offloading also greatly reduces the number of calls down through the software stack to send packets.

It is also evident from FIG. 2 that several inefficiencies persist despite the offloading operation. First, the host still winds up consuming a relatively high number of CPU cycles in processing ACKs for the packets that it did not segment. Second, the host cannot perform a second TCP segmentation offload until the available window size has grown. Since the window size will normally increase when data is ACKed, the window will not return to its original size until the first offload has been fully acknowledged. This can result in considerable bandwidth underutilization, particularly where the connection delay is significant and the default window size is small.

Although the TCP segmentation offload approach cannot avoid the first problem, the second can be somewhat mitigated by an increase in window size, thus allowing larger blocks to be offloaded. With Microsoft Windows operating systems, for instance, the default TCP window size can be modified by hand in the Windows registry. But hand-tuning is not well documented, and most users would not know how to do it correctly. Also, since normal operation in most networks involves transmitting large amounts of data from central servers to distributed clients, the window size that matters for server TCP offloading (that of the clients) is not under server control. And assuming that the window size could be adjusted, this may not be desirable in all situations, particularly where an unreliable connection is encountered. In summary, increasing window size on a significant fraction of clients by hand-tuning is both theoretically undesirable and practically unlikely to occur.

The present invention proposes to overcome the identified limitations of TCP segmentation offload. The basic capability that allows this is a segmentation offload feature with built-in network adapter support for the TCP windowing algorithm. Thus, the network adapter handles most communication tasks in a conventional manner. But when an offload operation is requested for a given connection, the network adapter preferably captures and processes ACKs for that connection until the offload operation is completed. This relieves the host CPU of the burden of processing a large number of intermediate ACKs that it really has no interest in. As an added benefit, because the network adapter comprehends ACKs for the offloaded segment, it can implement flow control, and therefore it can accept offload requests (preferably for several connection contexts simultaneously) for segments larger than the current window size.

Figure 3:
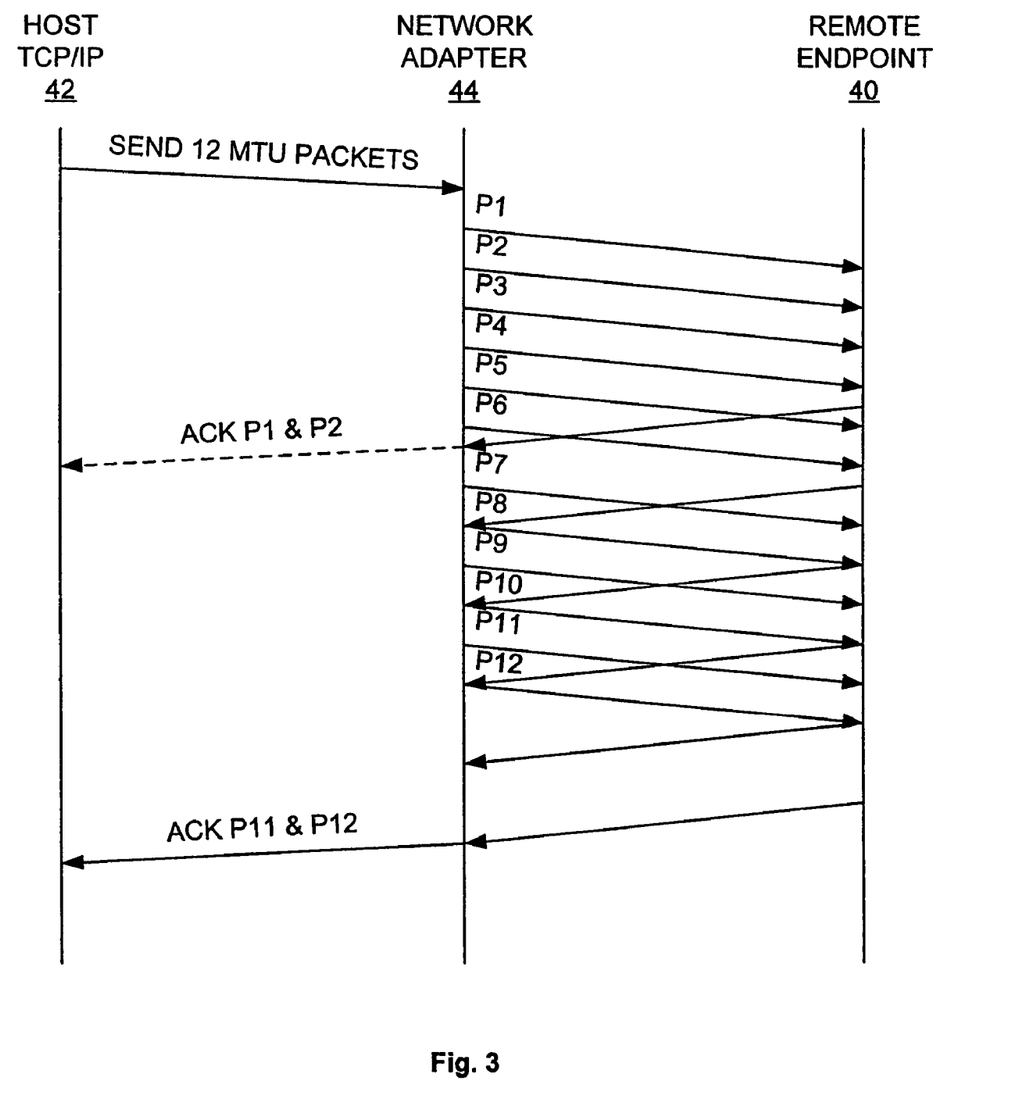
FIG. 3 shows a corresponding message sequence for transmission according to an embodiment of the invention.

To further illustrate this concept, FIG. 3 depicts, for the scenario of FIG. 2, the operation of a host TCP/IP protocol 42 and a network adapter 44 configured according to the invention. Although the twelve MTU data block of the first example exceeds the six MTU remote endpoint window size, in this embodiment TCP/IP 42 can request network adapter 44 to handle the entire transfer with a single request. As far as the details of building packets P1-P12, adapter 42 can function according to the description accompanying FIG. 2 for adapter 36. But adapter 44 also tracks several flow control variables for the duration of the offload operation, and differs from adapter 36 in several other significant aspects that will be explained below.

Adapter 44 will typically track at least four variables for each connection context that it is currently processing an offloaded operation for. The first variable is UNA, which corresponds to the highest acknowledgment number received from endpoint 40. The second variable is NXT, which corresponds to the sequence number of the next data octet to be sent. The third variable is WIN, which corresponds to the receive window size reported by endpoint 40. The fourth variable is TIMER, which roughly indicates the time at which an ACK packet will be considered overdue. A round trip time (RTT) value may be included with the TCP offload request, thus allowing the adapter's retransmission timer to benefit from the channel characteristics learned by the host TCP software.

Using the variables UNA, NXT, and WIN, adapter 44 calculates that it can transmit packets P1-P6 within the initial window size reported by endpoint 40. It builds and transmits these packets accordingly. After P6 is transmitted, adapter 44 knows that it has used up the available window and thus it waits for an acknowledgment from endpoint 40 before building more packets.

The ACK of packets P1 and P2 arrives shortly after P6 is transmitted. Adapter 44 matches this ACK packet to the open context and updates UNA and WIN according to the contents of the ACK packet. In this instance, the UNA and WIN variables indicate that the transmission of two more packets is now possible, so adapter 44 builds and transmits P7 and P8.

Note that in FIG. 3, this first ACK packet is also (optionally) passed through to host TCP/IP 42. This may be desirable for several reasons: the first ACK may acknowledge data transmitted by TCP prior to the offload operation, and thus is needed by TCP to avoid retransmission; the first ACK may be used by TCP to update its round trip time estimate. It is not necessary, however, from the operation of the network adapter, that the first ACK be reported, and reporting may even be made optional according to a flag accompanying the original offload request.

About the time that P8 is transmitted, an ACK packet is received at adapter 44 for packets P3 and P4. This ACK is trapped by adapter 44, and is not reported up the software stack. Adapter 44 updates UNA and WIN according to the contents of the ACK packet, and builds and transmits P9 and P10 accordingly. This process is repeated once more, for the ACK of packets P5 and P6 and the transmission of packets P11 and P12.

After P12 is transmitted, adapter 44 continues to trap ACKs for the context. When the ACK for P11 and P12 is received, adapter 44 reports this ACK up the software stack to indicate that the block transmission was successful. At this point, the connection context corresponding to the offload operation is closed.

Comparing FIG. 2 and FIG. 3, several benefits of the present invention are evident. First, the entire operation is significantly shortened: combining the two offload operations eliminates one of the ACK return trip delays of FIG. 2, as well as the software delay required to process the ACK of P5 and P6 and issue the second TCP offload request. Second, host software processing of the six ACKs, required by the prior art, is reduced to host software processing for two ACKs (one optional). This significantly reduces the demand on CPU resources that is required in conjunction with an offloaded request.

Figure 4:
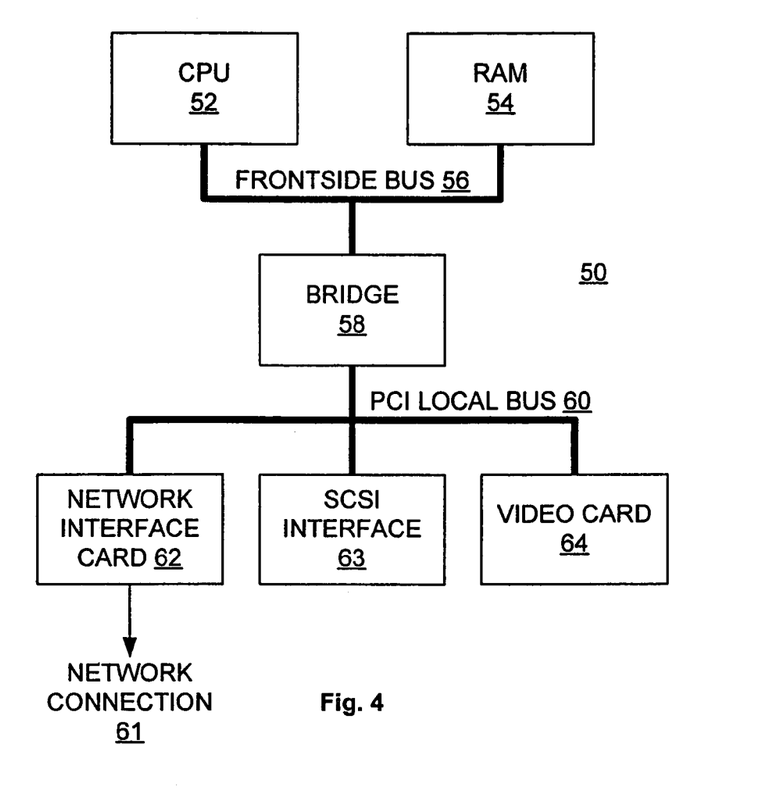
FIG. 4 illustrates a block diagram of a computer system according to an embodiment of the invention.

Tuning now to FIG. 4, a block diagram for a computer system 50 utilizing the invention is shown. The computer system's CPU 52 is coupled to RAM 54 via frontside bus 56, which may be, e.g., a Pentium Pro™ processor local bus. This bus is coupled to PCI local bus 60 through bridge 58, which allows communication between a first system element connected to frontside bus 56 and a second system element connected to PCI local bus 60.

Various peripherals can be connected to computer system 50 through PCI local bus 60. For instance, SCSI interface 63 can be used to connect disk drives to the system, and video card 64 provides an interface to a video monitor. Network interface card 62 also connects to PCI local bus 60, and includes an external network connection 61. Those skilled in the art will recognize that a wide variety of similar configurations are roughly equivalent to that shown for system 50, and that various well-known details, not pertinent to the invention, have been omitted.

During normal operation, CPU 52 is largely under software control. When operating according to one embodiment of the invention, TCP/IP software running on CPU 52 is configured with an offload capability that allows CPU 52 to temporarily relinquish outgoing flow control for a given TCP/IP connection to NIC 62, in conjunction with a request to NIC 62 to transmit a block of data. The configuration of NIC 62 according to an embodiment of the invention is described below.

Figure 5:
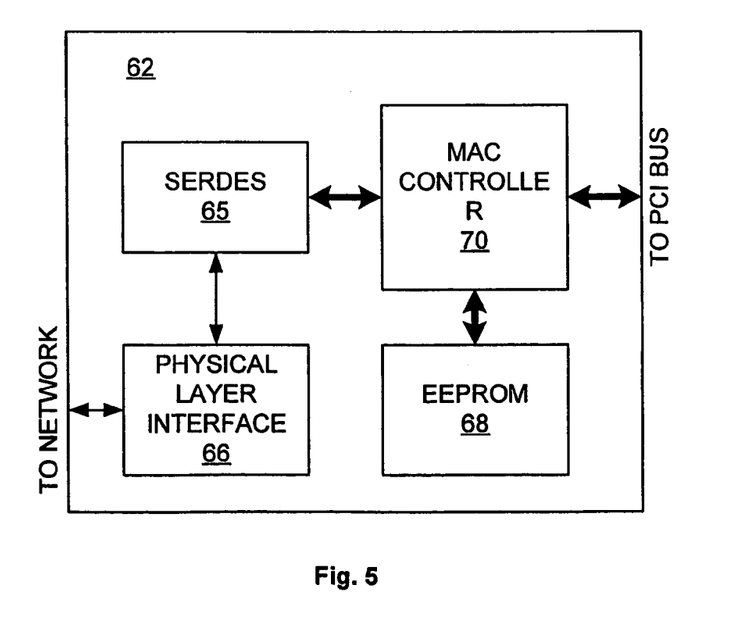
FIG. 5 depicts a network interface card according to an embodiment of the invention.

FIG. 5 shows a block diagram of NIC 62. Physical layer interface 66 handles network physical signaling tasks, i.e., modulation and demodulation of electrical or optical analog signals representing a digital bit stream. SERDES (Serializer/Deserializer) 65 provides conversion between the serial data format required by physical layer interface 66 and the parallel data format used elsewhere. MAC controller 70, using stored information from EEPROM 68, handles the bulk of the other tasks required of NIC 62. Turning now to the detailed configuration of MAC controller 70 shown in FIG. 6, task partitioning within MAC controller 70 will now be described.

Figure 6:
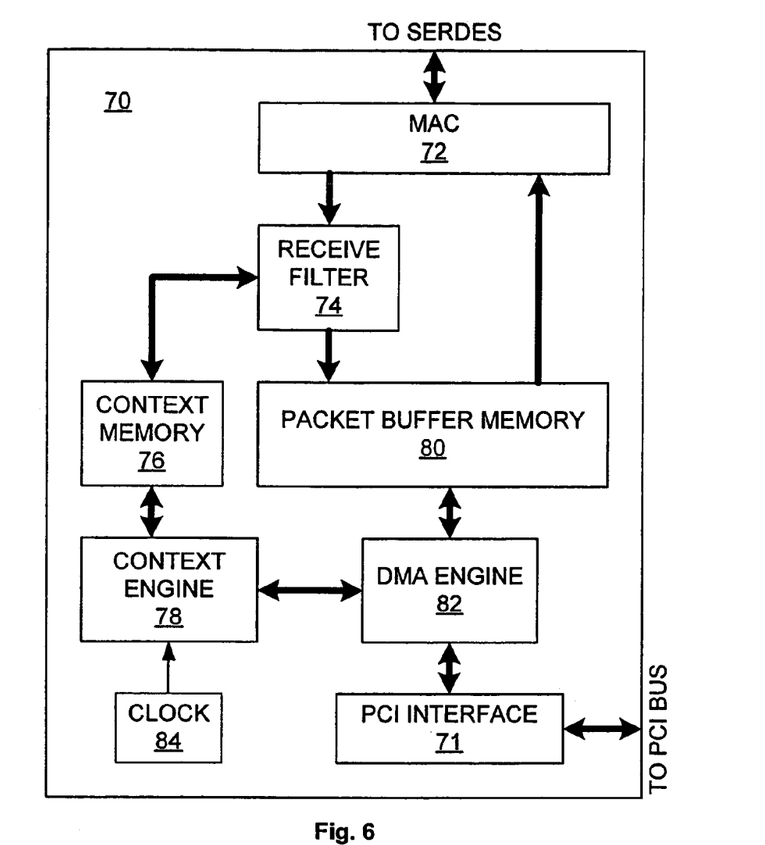
FIG. 6 shows details of the MAC controller for the network interface card of FIG. 5.

Within MAC controller 70, MAC 72 contains the logic necessary to implement, e.g., transmit and receive functions for the appropriate link-layer protocol, and to interface with packet buffer memory 80 and receive filter 74. For example, the transmit function can implement a Carrier Sense Multiple Access with Collision Detection (CSMA/CD) protocol using a collision detector and a backoff/retransmit timer. The transmitter and receiver can also implement CRC (Cyclic Redundancy Check) functionality. Such operations are well understood by those skilled in the art, and are preferably minimally impacted by the invention.

Receive filter 74 performs the conventional NIC function of filtering out link layer frames that are not meant for that NIC. But receive filter 74 also filters out received ACK frames that are meant for that NIC, but that will not be passed to the host CPU because they apply to a TCP context that is being handled by NIC 62. Operating in conjunction with context memory 76, receive filter 74 identifies ACK frames that match an open context, and may update that context in context memory 76 using information contained in the ACK frame. Receive filter 74 also decides whether to report such an ACK frame up the stack. Detailed operation of this aspect of receive filter 74 may be found in the description accompanying FIG. 8.

Packet buffer memory 80 resides between MAC 72 and DMA engine 82, and operates as a two-way FIFO (first in first out) for packets passing between them. Receive filter 74 places packets that are to be passed up the stack into packet buffer memory 80. DMA engine 82 takes packets from packet buffer memory 80 in turn and DMAs them to RAM 54 (see FIG. 4) using PCI interface 71. Likewise, for packets to be transmitted, DMA engine 82 DMAs the packet information from RAM 54 using supplied addresses and builds (or places if already built) the packets into packet buffer memory 80. MAC 72 takes these packets from packet buffer memory 80 for transmission in turn.

Context engine 78 handles transmission timing for offloaded data blocks. When DMA engine 82 receives a request over the PCI interface for an offload operation, it passes this request to context engine 78. Context engine 78 establishes a context for the offloaded block in context memory 76. Context engine 78 signals DMA engine 82 to build packets for the offloaded block at appropriate intervals based on flow control information that is updated in context memory 76 by receive filter 74. Because context engine 78 communicates mainly with DMA engine 82, in a preferred implementation context engine 78 and DMA engine 82 are integrated as a single functional unit.

Clock 84 supplies a time reference to context engine 78. When adapter 62 handles flow control for a context, clock 84 allows the context engine to detect when retransmission is required. Clock 84 can also aid context engine 78 in scheduling tasks for contexts.

Context memory 76 is preferably available to both receive filter 74 and context engine 78, although context engine 78 preferably has sole responsibility for opening contexts. The context memory can be designed to handle a single context. It can also be designed to handle multiple contexts, e.g., by storing each of several contexts in a separate record.

Figure 7:
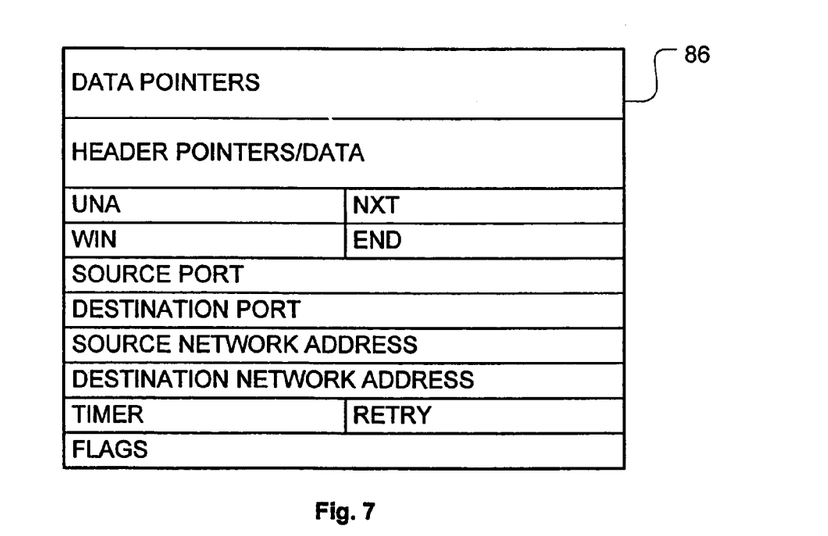
FIG. 7 shows a context data record structure.

FIG. 7 shows one possible configuration for a context record 86. The record contains data and header pointers needed to DMA information from RAM 54 (although the header pointers may be replaced by the actual header information to avoid multiple redundant reads). It also contains the counters UNA, NXT, WIN, and END, which are used for flow control. The source port, destination port, and source and destination network addresses are stored for use by receive filter 74 in detecting ACKs for the context. TIMER is used to indicate the retransmission time in the absence of an ACK from the remote endpoint. RETRY counts retransmission attempts, allowing the adapter to abort a context that repeatedly fails. Finally, FLAGS can be used to indicate optional settings, indicate whether the context is active, whether a first ACK packet has been received, etc.

Figure 8:
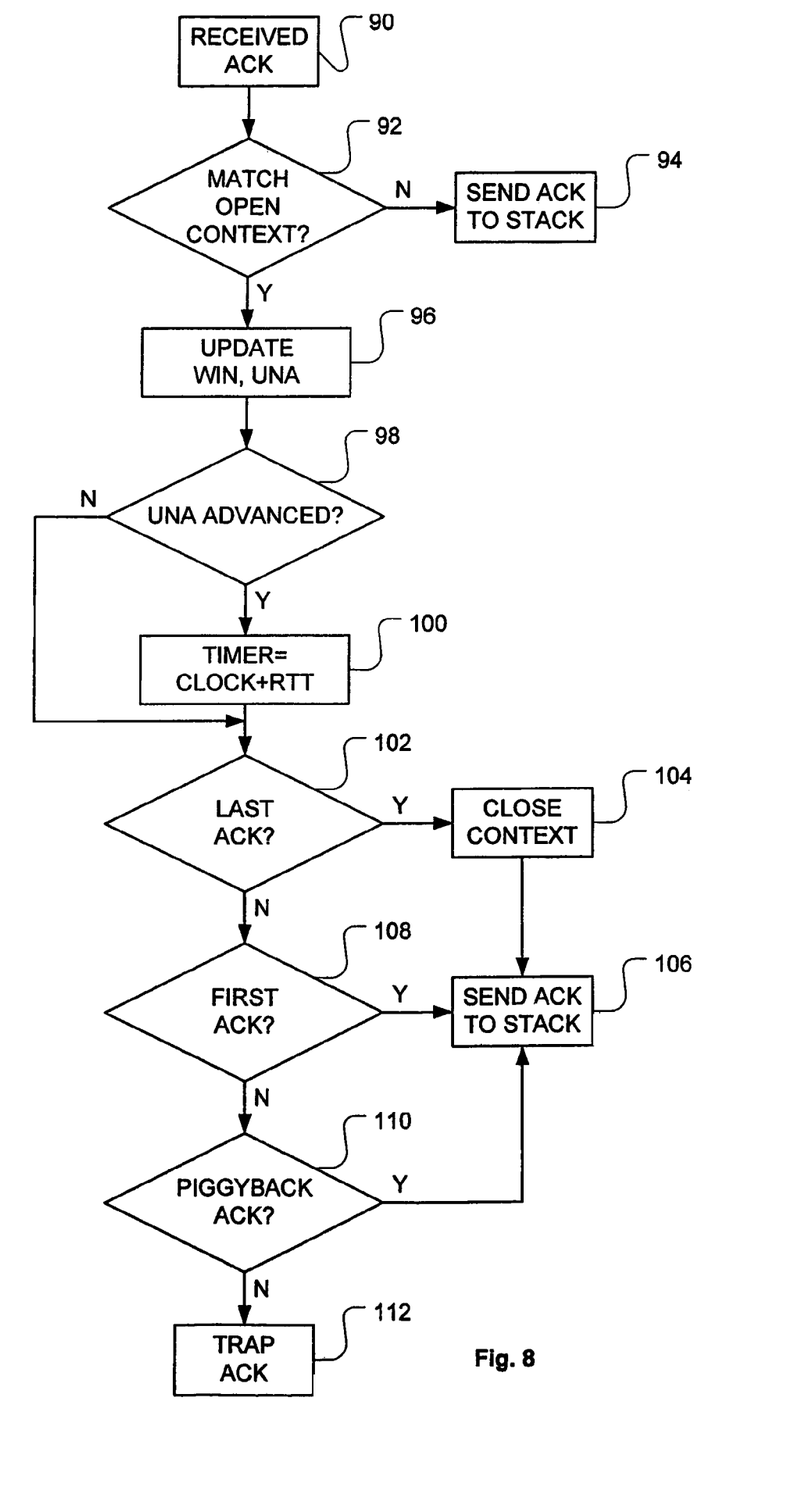
FIG. 8 illustrates a flow diagram for ACK packet filtering according to an embodiment of the invention.
Figure 9:
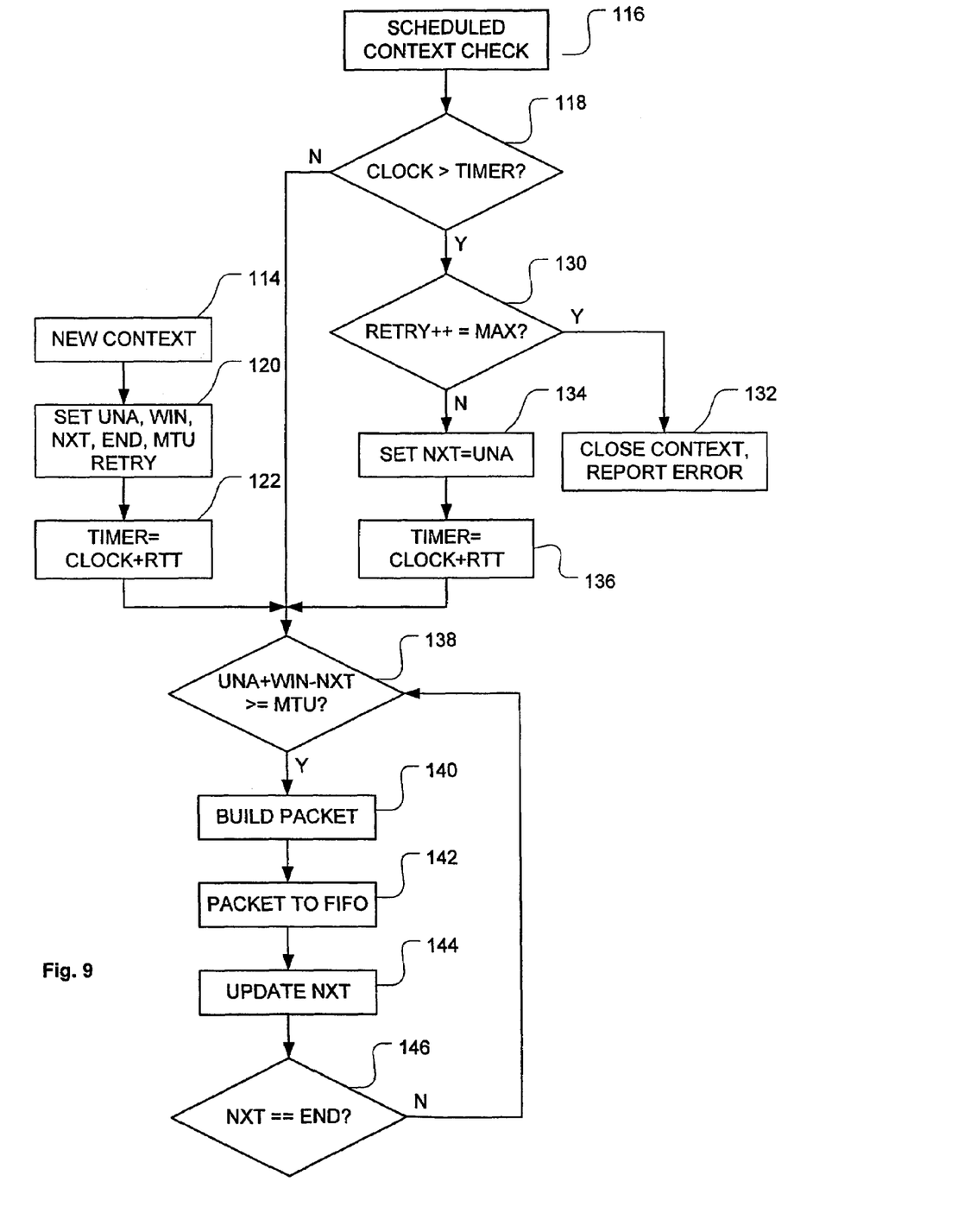
FIG. 9 illustrates a flow diagram for transmit flow control according to an embodiment of the invention.

FIGS. 8 and 9 illustrate, for one embodiment, several aspects of a packet flow control implementation for network adapter 62. FIG. 8 shows, in flow chart form, a process for trapping acknowledgments—one that can be used by receive filter 74. FIG. 9 shows, in flow chart form, a transmit packet flow control process that can be used by context engine 78.

Referring first to FIG. 8, an acknowledgment filtering process is implemented as follows. The network adapter, e.g. connected as in FIG. 4, will receive packets from a variety of remote endpoints, some packets destined for this network adapter and others not. The adapter first filters packets destined for a different Ethernet address. Of the remaining packets, when an offloaded connection context is active, some of the packets received should contain ACKs corresponding to the active connection context. The network adapter must sort the ACKs corresponding to the context from amongst all of its other received traffic. Typically, a first screening step will identify incoming packets having TCP payloads with a valid acknowledgment field. Such a packet will be identified as a "received ACK" and enter the flowchart of FIG. 8 at block 90.

For a received ACK, decision block 92 decides whether the ACK matches an active context (before this is done, packet checksums may be verified to ensure that the header data is valid). The number of offloaded connection contexts may be limited to one, in which case the matching operation can, e.g., compare the source and destination ports from the ACK TCP header to those of the context, and compare the source and destination network addresses of the ACK IP header to those of the context. If more than one simultaneous offloaded context is allowed, a wide variety of well-known techniques may be used to efficiently match the ACK TCP and IP headers against a list of active contexts obtained from context memory 76. If the ACK does not match any active context, it is queued for forwarding to the host's protocol stack (block 94) by placement in packet buffer memory 80.

When a received ACK matches an open context, the adapter takes several further actions regarding the packet. Receive filter 74 extracts the window and acknowledgment field data from the ACK packet, and uses these at block 96 to update, respectively, the WIN and UNA variables for the context. At decision block 98, it is determined whether UNA has advanced. If it has, TIMER is reset to CLOCK+RTT at block 100.

After context updates are performed, filter 74 determines whether the packet should be sent up the stack. Decision block 102 determines whether the ACK acknowledges the last packet of the context. If the acknowledgement indicates receipt of the last packet, the context is closed (optionally, the actual closing task can be left for context engine 78 to perform) at block 104, and the ACK (or some other indication) is sent up the protocol stack to signal successful completion of the offload operation (block 106).

As mentioned earlier, it may be preferable to send the first ACK that is received up the software stack. Decision block 108 may simply set a flag once an ACK has been processed, such that if the flag is not set, an ACK reaching block 108 is sent up the software stack at block 106. The decision may also be more complex. For instance, one or more ACKs received after the context has been opened could acknowledge data sent out by TCP prior to the context opening. In such a case, these could be sent up the stack without setting a "first ACK received" flag, since they pertain to data outside of the active context.

Another situation that may be addressed is that of the piggyback ACK. A piggyback ACK serves dual purposes—it transmits a data payload, but it also contains an acknowledgement of data received by its sender. In block 110 of FIG. 8, if the ACK packet contains a data payload, the packet is sent up the protocol stack (block 106), even if the ACK contained in that packet pertains only to context packets.

After passing through decision block 110, if the adapter has found no reason to supply the ACK to the host TCP/IP, the ACK is trapped at block 112. A trapped ACK is not sent up the stack, and is preferably simply flushed prior to packet buffer memory 80. The pertinent information from the ACK has already been used at this point to update the context within the adapter.

FIG. 9 illustrates process steps that are preferably performed by context engine 78 during context handling. Two entry points for the process steps are shown: entry point 114 is reached when the host requests a new offloaded task, and entry point 116 is reached according to a context service schedule.

Entry point 114 is reached when a new offloading task is requested by the host CPU. The network adapter initializes a new context corresponding to the task at block 114 when it DMAs the task parameters from RAM 54. At blocks 120 and 122, various calculated variables are then set: UNA, NXT, and WIN using host-supplied parameters; END as NXT+SIZE (the size of the offloaded block of data); RETRY to 0; and TIMER to CLOCK (the value of clock 84)+RTT (a host-supplied retransmission interval).

Entry point 116 will be reached at quasi-scheduled intervals according to a task scheduler in context engine 78. For instance, each time that DMA engine 82 pushes a transmit frame onto packet buffer memory 80, context engine 78 can check CLOCK to see how long it has been since it has checked the status of an open context. If a desired interval has elapsed since the last check, block 118 will be reached. If multiple contexts are open, each can be visited, e.g., in round-robin fashion so that all get served relatively equally. If the DMA engine has no other pending tasks to serve, context engine 78 can loop repeatedly from. block 116.

From entry point 116, CLOCK is first compared to TIMER for the current context, at decision block 118. If the comparison returns the value FALSE, an expected ACK from the remote endpoint is not yet overdue, and the retransmission logic is bypassed. If the comparison returns the value TRUE, however, the retransmission logic (blocks 130-136) is activated. First, decision block 130 increments RETRY, and then compares it to MAX (the maximum allowed number of retries). If MAX is exceeded, the context is closed and a retransmission error is reported up the stack (block 132). If MAX has not been exceeded, NXT is reset to UNA at block 134, indicating that all as-yet-unacknowledged data for the context is to be retransmitted. At block 136, TIMER is reset to CLOCK+RTT. Note that RTT may optionally be increased each time that retransmission is required.

Decision block 138 will be reached (1) for a new context, (2) for a retransmission attempt, and (3) at semi-regular intervals. Block 138 implements flow control via the TCP windowing mechanism. The value UNA+WIN−NXT is calculated for the context. This value represents the portion of the remotely advertised window that is available. If this value is greater than or equal to the lesser of one MTU and the amount of context data remaining to be sent, a one-MTU packet (possibly smaller if it is the last packet) is built at block 140. The packet is submitted to packet buffer memory 80 at block 142, and the value of NXT is incremented by the size of the TCP payload. At block 146, the value of NXT is compared to END. If they are equivalent, all data for the context has been transmitted. Note that a block like block 146 may optionally be included above block 138.

Most network adapters comprise both a hardware component and a software driver component that runs on the host. Although many of the functions described herein could be implemented in the software driver, those that require frequent memory operations, or that would require host CPU interrupts, would tend to destroy some of the advantages of the invention if implemented in software. Other functions, however, are well suited for software implementation. For instance, the driver can contain a packet segmentation offload scheduler that accepts requests from TCP/IP to segment a data block and temporarily handle flow control for that block. The scheduler would accept these requests and send them in an appropriate format and at an appropriate time to the network adapter hardware. Preferably, the scheduler would track requested, active, and completed contexts, and either queue requested contexts or reject requested contexts when the context hardware is already saturated. The scheduler may also include a status reporter for communicating the status of accepted requests to the higher-level protocol. This may include translating messages received from the hardware into TCP/IP understandable messages, and/or issuing some sort of "keep-alive" messages to TCP/IP when the context processing is delayed but proceeding normally.

Host TCP/IP software compatible with the disclosed embodiments should have the following capabilities. First, it should have a mechanism, either manual or automatic, for becoming aware that offloading with TCP windowing support is available. Second, it should refrain from transmitting information that might conflict with an offloaded context, while that context is active. For example, data packets for the same TCP connection as an offloaded context should not be sent while the context is active on the network adapter (unless this eventuality is handled by the adapter driver). But ACK packets, acknowledging data sent by the remote endpoint of the connection, may be submitted while the context is active. Another host TCP/IP capability is that it should disable retransmission logic for a connection with an active offloaded context: since an offloaded data block may lie large, if ACKs are filtered by the network adapter the host TCP/IP could go a long time without seeing an ACK from the remote endpoint. Preferably, the host TCP/IP can prioritize its transfers such that those that would benefit most from offloading are offloaded, with other transfers being handled through conventional TCP processing. For example, a connection that is in slow start or congestion mode should probably not be offloaded.

Various modifications to the above embodiments also fall within the invention. The described receive filter trapping and context update functions need not be incorporated in a receive filter prior to packet buffer memory. In some embodiments, this functionality can be placed entirely in the DMA engine, with filtering occurring before packets are DMA transferred to main memory. An advantage of this approach is that it loosens the time constraint on the pre-buffer processing, particularly where a large number of simultaneous offloaded contexts are being serviced. The disadvantage of this approach is that it adds some delay in when ACKs are processed for a context (although they are still processed much faster than if they were sent up the stack).

The NIC can also be designed to fetch more than one window size of data each time it performs a DMA operation from host memory. Data that fits within the current window can be immediately packetized, while the remainder of the data is temporarily stored in a prefetch memory onboard the NIC. The prefetch memory is preferably a different logical memory than the packet buffer memory, although both could share the same physical memory space on the NIC, and could even use defined operators to avoid physical memory movement when packets are "built". The minimum and maximum amounts of data that can be fetched in any DMA operation for a context could, e.g., be controlled by thresholds set by the device driver.

There can be several advantages to basing data fetch operations only loosely on window size. One advantage of fetching more than one window size of data is that fewer (but larger) transactions occur on the PCI bus, thus improving the efficiency of bus utilization—particularly when the window size is relatively small. Conversely, there is also an advantage in initially fetching less than one window size of data when the window is very large. By fetching less data, the packet buffer is less likely to be consumed by a stream of packets that are all part of one context, thus making it possible to achieve some level of "fairness" by increasing the amount of interleaving of packets from multiple contexts.

Another modification is that a context could be terminated after all data is transmitted, rather than waiting for all data to be ACKed before terminating the context. The adapter would signal the host that is has completed transmission (and preferably inform the host as to what part of the transmission has been ACKed). All further ACK processing, and any retransmission, would be handled by the TCP software. This will typically increase the host workload at least slightly, since more ACKs will be sent up the stack. But a benefit is that the connection that was tied up by the offloaded context becomes available for further transfers. This also frees up the adapter to accept a new offloaded context.

Where multiple contexts can be open at once, the round-robin approach mentioned above is only one of many possible approaches to scheduling. For instance, contexts could be prioritized such that when the NIC has an open window for multiple contexts, the context with the highest priority would be serviced first. The priority could be assigned by the protocol or the driver when the context is created (for contexts not assigned a priority or assigned the same priority, round-robin could be used to determine priority between them). Preferably, the NIC hardware supports both the round-robin and at least one priority approach, such that the software driver could configure the device to the desired scheduling approach.

One of ordinary skill in the art will recognize that the concepts taught herein can be tailored to a particular application in many advantageous ways. Context processing can be event driven as well as scheduled: for example, the receipt of an ACK packet for the context could trigger the context engine to see if the window has increased. When ACKs are being filtered, some may be periodically sent up the stack as progress updates to the host. Some of the network adapter functionality described herein may also be implemented in the software driver section of the adapter. The concepts taught herein are also applicable to reliable transport mechanisms other than TCP. Such minor modifications are encompassed within the invention, and are intended to fall within the scope of the claims.

What is claimed is:

1. A method comprising:
   receiving an offload request to transfer a data block to an endpoint, the data block having a segment size;
   calculating a number of packets that can be transmitted based on a receive window size of the endpoint;
   building a plurality of packets equal to the calculated number of packets, each packet including a portion of the data block;
   transmitting the plurality of packets to the endpoint;
   in response to one or more acknowledgements each indicating that the plurality of packets have been received by the endpoint, determining that transmission of additional packets is possible;
   repeating said calculating, building, transmitting, and determining until the data block has been transferred; and
   in response to receiving a last acknowledgement of the one or more acknowledgements that one or more packets having a last portion of the data block has been received, reporting the last acknowledgement to a host system.

2. The method of claim 1, wherein the segment size is greater than the receive window size.

3. The method of claim 1, wherein the offload request is received from a host, the method additionally comprising transmitting a first of the one or more acknowledgements to the host.

4. The method of claim 3, additionally comprising trapping one or more subsequent acknowledgements of the one or more acknowledgements.

5. The method of claim 1, additionally comprising maintaining at least one variable, and wherein said determining that transmission of additional packets is possible comprises for each of the one or more acknowledgements:
   matching the acknowledgement to a connection context;
   determining a number of additional packets that are transmittable based on the at least one variable; and
   updating one or more of the at least one variable.

6. The method of claim 5, wherein said maintaining at least one variable comprises maintaining a timer variable to indicate a time at which an acknowledgement of the one or more acknowledgements is considered overdue, the method additionally comprising determining if any of the one or more acknowledgements is overdue based on the timer variable and a host clock.

7. The method of claim 1, additionally comprising trapping each acknowledgment.

8. The method of claim 1, wherein the offload request is associated with a connection context, additionally comprising closing the connection context.

9. An apparatus comprising:
   a network adapter to perform the following operations:
   receive an offload request to transfer a data block to an endpoint, the data block having a segment size;
   calculate a number of packets that can be transmitted based on a receive window size of the endpoint;
   build a plurality of packets equal to the calculated number of packets, each packet including a portion of the data block;
   transmit the plurality of packets to the endpoint;
   in response to one or more acknowledgements each indicating that the plurality of packets have been received by the endpoint, determine that transmission of additional packets is possible;
   repeat said calculate, build, transmit, and determine operations until the data block has been transferred; and
   in response to receiving a last acknowledgement of the one or more acknowledgements that one or more packets having a last portion of the data block has been received, reporting the last acknowledgement to a host system for the network adapter.

10. The apparatus of claim 9, wherein the segment size is greater than the receive window size.

11. The apparatus of claim 9, wherein the offload request is received from a host, and wherein the network adapter is to additionally transmit a first of the one or more acknowledgements to the host.

12. The apparatus of claim 11, wherein the network adapter is to additionally trap one or more subsequent acknowledgements of the one or more acknowledgements.

13. The apparatus of claim 9, wherein the network adapter is to additionally trap each acknowledgment.

14. The apparatus of claim 9, wherein the offload request is associated with a connection context, wherein the network adapter is to additionally close the connection context.

15. A system comprising:
   a motherboard; and
   a network adapter coupled to the motherboard to perform the following operations:
   receive an offload request to transfer a data block to an endpoint, the data block having a segment size;
   calculate a number of packets that can be transmitted based on a receive window size of the endpoint;
   build a plurality of packets equal to the calculated number of packets, each packet including a portion of the data block;
   transmit the plurality of packets to the endpoint;
   in response to one or more acknowledgements each indicating that the plurality of packets have been received by the endpoint, determine that transmission of additional packets is possible;

repeat said calculate, build, transmit, and determine operations until the data block has been transferred; and wherein in response to receiving a last acknowledgement of the one or more acknowledgements that one or more packets having a last portion of the data block has been received, the method additionally comprising reporting the last acknowledgement to the system.

16. The system of claim 15, wherein the segment size is greater than the receive window size.

17. The system of claim 15, wherein the offload request is received from a host, wherein the network adapter is to additionally transmit a first of the one or more acknowledgements to the host.

18. The system of claim 17, wherein the network adapter is to additionally trap one or more subsequent acknowledgements of the one or more acknowledgements.

19. The system of claim 15, wherein the network adapter is to additionally trap each acknowledgment.

20. The system of claim 15, wherein the offload request is associated with a connection context, wherein the network adapter is to additionally close the connection context.

21. An article of manufacture including a computer-readable storage medium having stored thereon instructions, the instructions when executed by a processor, result in the following:

receiving an offload request to transfer a data block to an endpoint, the data block having a segment size;

calculating a number of packets that can be transmitted based on a receive window size of the endpoint;

building a plurality of packets equal to the calculated number of packets, each packet including a portion of the data block;

transmitting the plurality of packets to the endpoint;

in response to one or more acknowledgements each indicating that the plurality of packets have been received by the endpoint, determining that transmission of additional packets is possible;

repeating said calculating, building, transmitting, and determining operations until the data block has been transferred; and in response to receiving a last acknowledgement of the one or more acknowledgements that one or more packets having a last portion of the data block has been received, reporting the last acknowledgement to a host system.

22. The article of claim 21, wherein the segment size is greater than the receive window size.

23. The article of claim 21, wherein the offload request is received from a host, and wherein the instructions further include instructions for transmitting a first of the one or more acknowledgements to the host.

24. The article of claim 23, wherein the instructions further include instructions for trapping one or more subsequent acknowledgements of the one or more acknowledgements.

25. The article of claim 21, wherein the instructions further include instructions for trapping each acknowledgment.

26. The article of claim 21, wherein the offload request is associated with a connection context, and wherein the instructions further include instructions for closing the connection context.

* * * * *